INVENTORS
THURLOW M. GORDON, JR.
HOWARD L. TAYLOR, JR.
BY Byerly, Townsend & Watson
ATTORNEYS

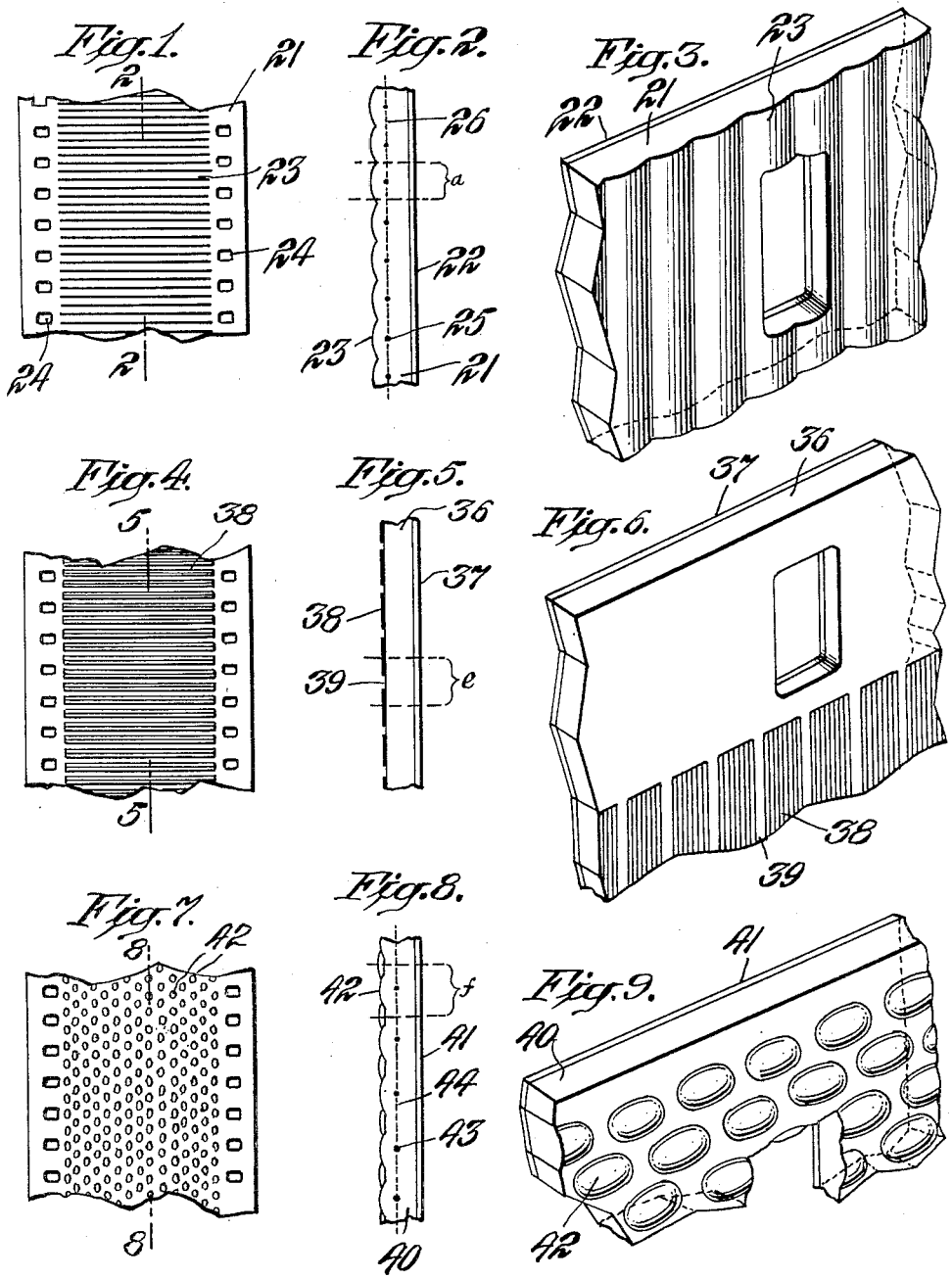

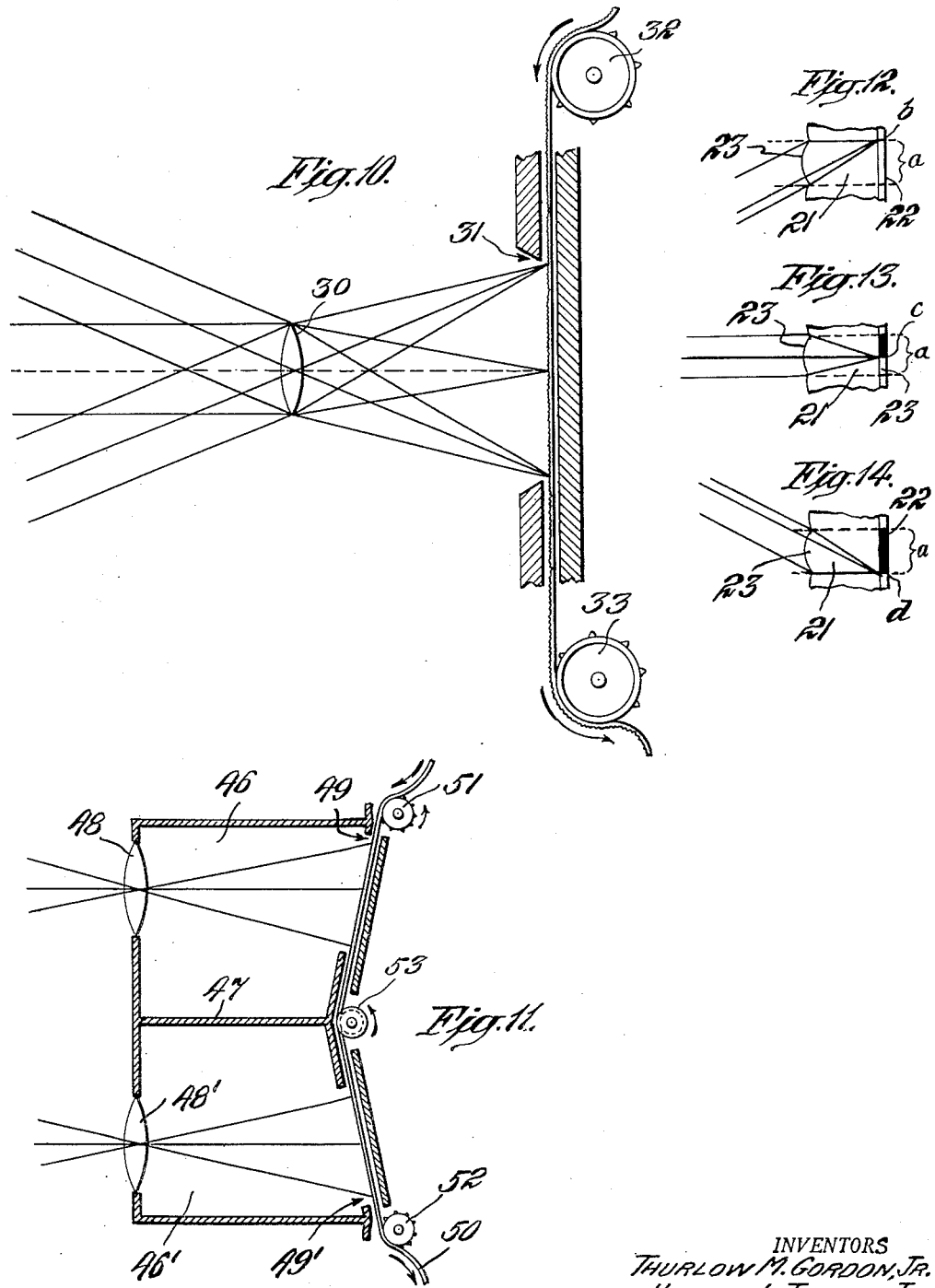

United States Patent Office 2,823,578
Patented Feb. 18, 1958

2,823,578

METHODS OF EXPOSING MOTION PICTURE FILM AND OF PROJECTING MOTION PICTURES

Thurlow M. Gordon, Jr., Brookfield, and Howard L. Taylor, Jr., Brookfield Center, Conn.

Application May 10, 1951, Serial No. 225,632

1 Claim. (Cl. 88—16.6)

This invention relates to motion pictures and aims to provide improved methods of exposing motion picture film and of projecting motion pictures with the exposed film.

In the past, when a scene or subject has been photographed with a motion picture camera, successive sections of the film have been separately exposed and it has been necessary that the film be at rest during each such exposure. After one section or frame was exposed, the shutter of the camera was closed and the film was suddenly and rapidly moved into position for exposure of the succeeding frame, when the film was suddenly brought to rest and the camera shutter was briefly opened to permit the second exposure. This cycle of operations was repeated until the desired length of film had been exposed to the scene photographed. If the film had not been stationary while the camera shutter was open, a useless blur rather than an image of the subject photographed would have resulted. A like stop-and-go travel of the developed film through a motion picture projector was necessary when the film was viewed.

This requirement of intermittent movement of the film during exposure and projection has necessitated complicated and expensive motion picture cameras and projectors and has imposed a very considerable strain upon the film itself with the result that the film was apt to wear out rapidly or to tear after a number of showings, making it necessary to remove and discard considerable portions of the film in order to effect repairs.

The foregoing difficulties have long been known and various expedients have been suggested in attempts to overcome them. However, those expedients also suffered from limitations arising from the need for critical synchronization of film and moving optical members. The dimensional instability of motion picture film, and performance changes which appeared when moving parts became worn have rendered impractical for general use previous methods which have been suggested to overcome the difficulties referred to above.

We have discovered that, by interposing between the taking lens of a motion picture camera and the light-sensitive coating of motion picture film an appropriate control screen, it is possible to form in the light-sensitive coating a series of latent images of the subject photographed by causing the film and control screen to travel at constant and uniform speed through the film gate of the camera while the camera shutter is open. After development of a film which has been exposed in this manner, it can be viewed by running it and a like control screen through a simplified projector at constant speed. Wear on the film is thereby reduced and the complicated mechanisms which have been employed in motion picture cameras and projectors to secure the stop-and-go motion of the film which has been necessary in the past are dispensed with.

Motion picture film bearing a light-sensitive coating is exposed in accordance with our invention by moving the film at constant speed through the picture gate of a camera having an open taking lens. A screen which is interposed between the taking lens of the camera and the film is moved with the film through the picture gate. The screen is provided with a series of elements which subdivide the film into a corresponding series of units which do not overlap, but which are preferably substantially contiguous, and each of those elements is adapted to restrict the point at which light admitted through the taking lens of the camera reaches the light-sensitive coating of the film unit associated therewith to a portion of said light-sensitive coating whose position on the unit varies as said unit moves through the film gate.

Motion pictures are projected in accordance with our invention by moving developed film, which has been exposed in conjunction with a control screen as aforesaid, at constant speed through the picture gate of a projector between a light source and an open lens focused on a projection screen. A control screen corresponding to the control screen associated with the film during exposure thereof is moved with the film through the picture gate of the projector so that the path of the light through which the record was formed in the film during exposure is retraced.

It is a further and important feature of our invention that it renders possible exposure of motion picture film in such a manner that a series of sets of images of a scene can be formed in the film and the images of each set may, if desired, be stereoscopically related.

Past systems designed to produce three-dimensional or stereoscopic motion pictures have been subject to serious limitations which have prevented the production of stereoscopic motion pictures in any substantial quantities. Such systems may be divided into two main groups:

The first group includes the systems which require the observers to view the projected images with the aid of special spectacles whose glasses are color filters, for example, in the anaglyph type of projection, or whose glasses are made of polarizing material with their axes of polarization at right angles while the projected images are suitably polarized. The requirement for special spectacles is objectionable because it imposes a viewing restriction. Furthermore, the systems which obtain image separation by this method are limited to the projection of a single stereoscopic pair.

The second group includes those systems which, through the use of separation screens of various kinds, overcome the limitation introduced by spectacles. Systems which employ complex reflective surfaces involve very high installation costs and they are practical for viewing by small audiences only. Systems which employ separation screens of the vertical-grating or lenticular type are more economical and efficient but these too have been subject to serious limitations. The use of separate cameras with synchronized shutters to record on separate films which are then projected by means of similar projectors is not readily adaptable to recording more than two images and serious problems in synchronization are encountered. Attempts to record stereoscopically-related frames on a single film as normal two-dimensional pictures have required resort to objectionably small frame size or to film advance at objectionably high speeds. Attempts to record stereoscopically-related pictures in composite form as stereograms of the parallax type have been characterized by severe problems of registration on separation screens.

We have discovered that the foregoing disadvantages inherent in the past systems for making three-dimensional motion pictures can be avoided by causing an appropriate control screen to travel with motion picture film at constant speed through a motion picture camera having offset picture gates, each of which has an open taking lens associated therewith. The screen is interposed between the lenses and the film and contains a series of elements which subdivide the film into a corresponding series of discrete units. Each screen element restricts the point at which light admitted through one of the taking lenses reaches the light-sensitive coating of the associated film unit to a limited area which sweeps across a portion of said light-sensitive coating, and restricts the point at which light admitted through another taking lens reaches the light-sensitive coating of said film unit to a limited area which sweeps across another portion of the light-sensitive coating of that film unit as the unit moves through the picture gates of the camera.

After our exposed film has been developed, motion pictures can be projected therewith by moving the film, and a control screen corresponding to the control screen used in making the exposure, through a simplified type of projector at constant speed. In the case of ordinary two-dimensional pictures, the film travels through the picture gate of the projector between a light source and an open lens focused upon a projection screen. In projecting stereoscopically-related pictures, the projector contains a pair of picture gates whose positions correspond to the positions of the picture gates in the camera through which exposure was made. Each picture gate is located between a light source and an open lens focused upon a viewing separation screen.

In order that our invention will be clearly understood by those skilled in the art, we will describe the method of exposing motion picture film in accordance therewith which we now prefer, with reference to the apparatus illustrated diagrammatically in the accompanying drawings in which:

Fig. 1 is a plan view of a short length of motion picture film having associated therewith a control screen of the cylindrical lenticule type;

Fig. 2 is a greatly enlarged section along a portion of the lines 2—2 of Fig. 1;

Fig. 3 is an isometric view greatly enlarged of a fragment of film and control screen of the type illustrated in Fig. 1;

Fig. 4 is a plan view of a short length of motion picture film having associated therewith a control screen of the grating type;

Fig. 5 is a greatly enlarged section along a portion of the lines 5—5 of Fig. 4;

Fig. 6 is an isometric view greatly enlarged of a fragment of film and control screen of the type illustrated in Fig. 4;

Fig. 7 is a plan view of a short length of motion picture film having associated therewith a control screen of the spherical lenticular type;

Fig. 8 is a greatly enlarged section along a portion of the lines 8—8 of Fig. 7;

Fig. 9 is an isometric view greatly enlarged of a fragment of film and control screen of the type illustrated in Fig. 7;

Fig. 10 is a diagrammatic illustration of a camera adapted for use in the production of two-dimensional motion pictures in accordance with our invention;

Fig. 11 is a diagrammatic illustration of a camera adapted for use in the production of stereoscopic motion pictures in accordance with our invention;

Figs. 12–14 illustrate diagrammatically the manner in which the control screen used in the practice of our invention causes the light-sensitive coating of a motion picture film to be scanned by a thin line of light as it travels through the film gate of a motion picture camera;

Figure 15:
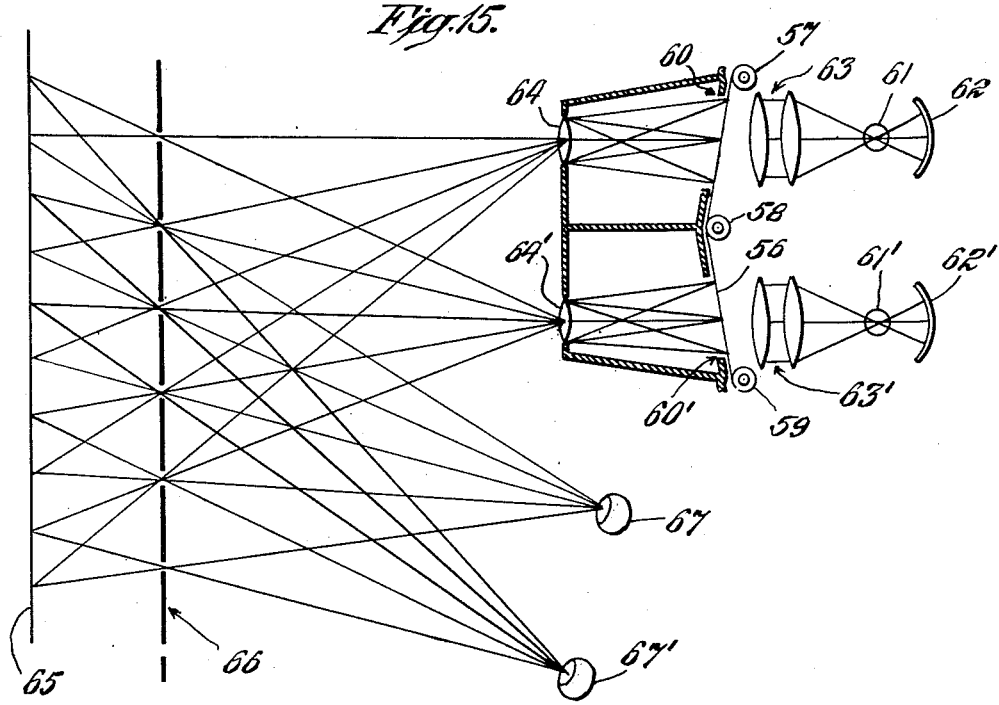
Figure 16:
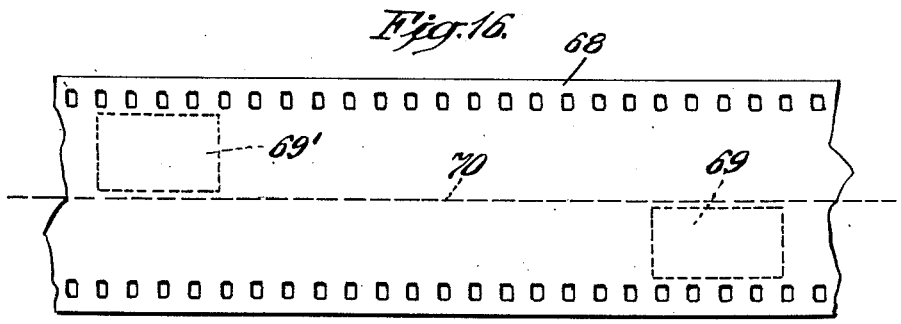

Fig. 15 is a diagrammatic illustration of the manner in which a stereoscopic motion picture, exposed in accordance with our invention, is projected and viewed by an observer; and Fig. 16 is a plan view of a short length of motion picture film illustrating diagrammatically the division of the film into upper and lower areas for separately recording two motion pictures, in accordance with our invention.

The film which we prefer to use in the practice of our invention is illustrated in Figs. 1–3, inclusive. It consists of a strip of flexible, transparent material 21 whose rear surface is coated with a layer 22 of light-sensitive material. The face of the strip 21 has a series of transverse corrugations 23 each of which constitutes a cylindrical lenticule. Sprocket holes 24 are provided along each edge of strip 21. The lenticules 23 can be formed on the face of the film by various methods such as, for example, embossing or molding. The lenticules 23 are of uniform curvature with their axes 25 on a common plane 26, and with their focal plane along the light-sensitive layer 22. Each lenticule 23 subdivides the film into a unit $a$.

The film 21 is exposed by causing it to travel through a camera of simplified construction such as that illustrated in Fig. 10 wherein only those parts are shown which are necessary to an understanding of our invention. That camera contains a taking lens 30 which forms a sharp image of the subject in the film gate 31. The film 21 is conveyed through film gate 31 and along the image plane of lens 30 by a constant-speed pull-down sprocket 32 and a hold-down sprocket 33 which is synchronized with sprocket 31 and is adjustable for film tension.

As indicated in Fig. 10, the picture gate contains a large number of screen elements 23 and associated film units $a$. For purposes of simplicity, the action of one of the screen elements 23 upon its associated film unit $a$ as that screen element and film unit pass through the field of lens 30 will be described, it being understood that, as the successive screen elements and associated film units travel through the film gate, they behave in like manner:

Screen element 23 and its associated film unit $a$ travel through picture gate 31 at constant speed, during all of which time lens 30 is open and light is admitted to the camera. However, not all of the light-sensitive coating of the film unit is exposed at one time. The relationships of lens 30, the dimensions of the picture gate, the width and focal length of the lenticules comprising screen elements 23 and the distance between those screen elements and the light-sensitive coating 22 are such that, at each point in the path of travel of the film through the picture gate, only a thin, transverse line of light is admitted to the coating 22. The location and pattern of that line of light are dependent upon the position in the film gate of the screen element 23.

For instance, as a screen element 23 enters the picture gate, the light which reaches coating 22 of the associated film element $a$ is confined to a thin line $b$ along the edge of that film unit (Fig. 12). As this screen element progresses along its path through the picture gate, the point at which the transverse line of light reaches the light-sensitive coating of the associated film element is caused, by parallax, to shift toward the other edge of that film element. When the film element reaches the middle of the picture gate, its optical axis and the optical axis of lens 30 will coincide and light reaching light-sensitive coating 22 will be confined to the transverse line $c$ at the center of the film unit, at which time one-half of the light-sensitive area will have been exposed as a continuous trace of a thin line of light. At the point where screen element 23 leaves the film gate 31, the light which reaches the light-sensitive coating of the associated film element is confined to the line $d$ (Fig. 14) when all of the light-sensitive coating of the associated film unit will have been scanned by a thin line of light and the film unit will contain a latent image of the subject photographed.

It is merely necessary in viewing developed film which has been exposed as described above to retrace the light path through which the record was formed in the film. This can be accomplished through the use of a simplified type of projector (not shown) in which a projection lens is substituted for the taking lens 30 of the camera illustrated diagrammatically in Fig. 10 and a light source is placed behind the film. The aggregate of all the thin lines of light which are admitted to the light-sensitive coating of all the film units contained within picture gate 31 at a given instant constitutes the entire image of the subject. When the light paths forming all of these thin lines are retraced through a projector, an image of the object photographed will be formed on an ordinary projection screen. By causing the film to travel through the projector at uniform speed, a moving picture of the subject photographed will result.

The film illustrated in Figs. 4–6, inclusive, is provided with a control screen of the grating type. It consists of a strip of flexible transparent material 36 whose rear surface is coated with a layer 37 of light-sensitive material. The face of the film contains opaque transverse bands 38 separated by transparent areas 39 to provide a series of substantially contiguous film units *e*.

The film illustrated in Figs. 7–9, inclusive, has a spherical lenticular control screen associated therewith. It consists of a strip of flexible transparent material 40 whose rear surface is coated with a layer 41 of light-sensitive material. The face of the strip has a series of spherical lenticules 42 of uniform curvature with their axes 43 on a common plane 44, and with their focal plane along the light-sensitive layer 41. These screen elements 42 subdivide the film into a series of substantially contiguous film units *f*.

The functions of the control screens illustrated in Figs. 4–6, inclusive, and Figs. 7–9, inclusive, are similar to that of the screen illustrated in Figs. 1–3, inclusive. As the film illustrated in Figs. 4–6, inclusive, travels at constant speed through the picture gate of a camera along the image plane of the taking lens, the screen elements 38 cause the light-sensitive coating of the film unit *e*, which is associated therewith, to be swept by a thin line of light. As the film illustrated in Figs. 7–9, inclusive, travels at constant speed through the picture gate of a camera along the image plane of the taking lens, screen element 42 causes the light-sensitive coating of film unit *f* associated therewith to be swept by a point of light. However, the cylindrical lenticular type of control screen is preferred as its use results in better definition. Light losses associated with screens of the grating type make those of the lenticular type more satisfactory.

In exposing motion picture film, in accordance with our invention, to secure a plurality of sets of images which may be stereoscopically related, a control screen such as we have described above can be used in conjunction with a camera having an optical system which continuously focuses light from the subject upon spaced sets of screen elements as the film travels through the camera at constant speed. Such a camera, and one which we now prefer to use in the practice of our invention because of its simplicity of construction and low cost, is illustrated diagrammatically in Fig. 11. That camera contains a pair of compartments 46, 46′ which are separated by a light-tight partition 47. The compartments 46, 46′ are provided, respectively, with taking lenses 48, 48′ and picture gates 49, 49′. The film 50 and its control screen are caused to travel at constant speed through the picture gates 49, 49′ by a constant-speed pull-down sprocket 51 and a hold-back sprocket 52 in conjunction with a guide-sprocket 53.

The film 50 is preferably of the type illustrated in Figs. 1–3 and bears on its face screen elements 23 composed of transverse, cylindrical lenticules. The film 50 is caused to travel through the film gates 49, 49′ at constant speed during all of which time the lenses 48, 48′ are open. As the film 50 travels through the camera, there are always a great many screen elements 23 and associated film units *a* in each of the picture gates 49, 49′, and each of those film elements concentrates its portion of the image formed by the taking lens into a thin line on the light-sensitive coating of its associated film unit *a*.

As each film unit *a* advances across a picture gate 49 or 49′, parallax causes the image line produced by its screen element 23 to shift gradually along the light-sensitive layer 22. The amount of this shift is governed by the focal length of screen element 23 and its distance from the optical center of taking lens 48 or 48′. Thus, by proper control of these factors, it is possible to expose all or part of the light-sensitive coating on the film units during the period when they travel through a picture gate. Furthermore, it is possible to locate such a partial area of exposure anywhere on the light-sensitive coating of each film unit as by inclining the picture gate, and the path of the film therethrough, with reference to the optical axis of the taking lens.

For example, this inclination of the picture gate may be effected about an axis lying in the plane of the film perpendicular to the direction of film flow. By selecting the governing factors referred to above so as to cause only one-half of the light-sensitive coating of each film unit *a* to be exposed during its travel through a picture gate, and by inclining the picture gate 49 so as to expose only the area lying at one side of the optical axis of a film unit, the exposure in film gate 49 is limited to that portion of the light-sensitive coating which is contained between the edge and the middle of each film unit, as indicated at *c* in Fig. 13. By equal but opposite inclination of the second picture gate 49′, the remaining half of the light-sensitive coating of each film unit is exposed as it travels through that picture gate. As half of the light-sensitive coating of a film unit *a* is exposed in picture gate 49, an opposite half of the light-sensitive coating of another film unit receives a like exposure in the picture gate 49′. Pairs of latent images are thereby formed in complementary portions of the light-sensitive coatings of pairs of film units *a* which are spaced from each other so that the images of each pair are stereoscopically related.

After developing a motion picture film which has been exposed in a camera of the type illustrated in Fig. 11, as described above, the stereoscopically related images can be projected upon a viewing separation screen. The correct picture will be seen by each eye of an observer and these pictures are combined by the visual process of the human eye and brain to produce a stereoscopic motion picture sensation. A projection system through which this is accomplished is illustrated diagrammatically in Fig. 15:

The developed film 56 and associated control screen are advanced at constant speed by sprockets 57, 58, 59 through a projector having two picture gates 60, 60′ whose orientations correspond with those of the picture gates 49, 49′, respectively, in the taking camera. Illumination is provided by the light sources 61, 61′ in conjunction with reflectors 62, 62′ and condensers 63, 63′. Open projection lenses 64, 64′ selectively project the stereoscopically related images upon a separation screen comprising a projection surface 65 having screen member 66 positioned a short distance in front of it. The screen member 66 is illustrated as a grating by way of example and its proportions with respect to the projector are greatly exaggerated for the sake of simplicity in illustrating the selective light paths which are represented by lines passing from projection lenses 64, 64′ through the screen grating 66 to the projection surface 65 and thence through screen 66 to the eyes of the observer which are indicated at 67, 67′.

Our invention also permits exposing motion picture film to two or more different subjects on separate areas which adjoin over the length of the film. This is illustrated diagrammatically in Fig. 16, wherein a strip of film 68, which has associated with it a control screen of the type described above, is caused to travel at a continuous rate through a pair of ordinary picture gates 69, 69′, one of which is located below and the other of which is located above the median line 70 of the film: When the strip of film 68 travels from left to right, the lens associated with picture gate 69' is closed and the photographic record of picture gate 69 is recorded on the lower half of the film and over its entire length. After the entire film has traveled through picture gate 69, its direction of travel is reversed and then the lens associated with picture gate 69' is open while the lens associated with picture gate 69 is closed. It will, of course, be appreciated that if both of the lenses associated with picture gates 69 and 69' were open while the film traveled through those picture gates, a stereoscopic motion picture record would be obtained.

The terms which we have used in describing our invention are terms of description and not of limitation, and it will be appreciated that various modifications may be made in the preferred method of practicing our invention which has been set forth above without departing from the spirit thereof as it is defined in the appended claims. For instance, the control screen which travels with the film through the film gates of a camera and projector need not be integral with the film. A separate control screen may be employed but we prefer that it be integral with the film as problems of synchronization are avoided thereby.

What is claimed is:

The method of exposing motion picture film bearing a layer of light-sensitive material to form a series of sets of longitudinally disposed stereoscopically-related latent images in said light-sensitive layer, which comprises moving the film at constant speed through a camera having a pair of separate picture gates and an open taking lens associated with each of said picture gates, said picture gates being so disposed that the respective paths of the film therethrough are equally but oppositely inclined from the plane of the taking lens associated therewith, and moving through said picture gates with said film a screen interposed between said lens and the light-sensitive layer, said screen having a series of elements subdividing the film into a corresponding series of discrete units, each of said elements being adapted to restrict the point at which light admitted through one of said taking lenses reaches substantially the full width of the light-sensitive layer of the associated film unit to a limited area which sweeps across half in the direction of sweep of the light-sensitive layer of the film unit associated therewith and to restrict the point at which light admitted through the other of said taking lenses reaches the full width of the light-sensitive layer of said associated film unit to a limited area which sweeps across the balance of said light-sensitive layer as said unit moves through said picture gates successively.

References Cited in the file of this patent

UNITED STATES PATENTS

| 2,185,610 | Stephen et al. | Jan. 2, 1940 |

FOREIGN PATENTS

| 789,250 | France | Aug. 12, 1935 |
| 522,163 | Great Britain | June 11, 1940 |